US007181331B2

(12) United States Patent
Katoh

(10) Patent No.: US 7,181,331 B2
(45) **Date of Patent: *Feb. 20, 2007**

(54) ENGINE AIR-FUEL RATIO CONTROL SYSTEM

(75) Inventor: Hiroshi Katoh, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/229,574

(22) Filed: Sep. 20, 2005

(65) Prior Publication Data

US 2006/0112942 A1 Jun. 1, 2006

(30) Foreign Application Priority Data

Sep. 29, 2004 (JP) ............................ 2004-282898
Sep. 29, 2004 (JP) ............................ 2004-282900
Sep. 29, 2004 (JP) ............................ 2004-282901

(51) Int. Cl.
*B60T 7/12* (2006.01)
*F02B 75/08* (2006.01)

(52) U.S. Cl. ...................................... 701/103; 123/687

(58) Field of Classification Search ................ 701/101, 701/103, 104, 114, 115; 123/434, 674, 681, 123/685, 688, 691
See application file for complete search history.

(56) References Cited

U.S. PATENT DOCUMENTS 4,669,439 A * 6/1987 Mamiya et al. ............. 123/674
5,381,767 A * 1/1995 Kikuchi ................. 123/339.15
5,887,421 A * 3/1999 Mitsutani ..................... 60/274
6,591,822 B2 * 7/2003 Dohta ........................ 123/672
6,644,291 B2 * 11/2003 Stroh et al. ................ 123/674
7,047,123 B2 * 5/2006 Katoh ........................ 701/104
2002/0005192 A1 * 1/2002 Dohta ........................ 123/674
2003/0172914 A1 * 9/2003 Stroh et al. ................ 123/674
2005/0022504 A1 * 2/2005 Miura ......................... 60/274
2005/0022516 A1 * 2/2005 Miura ......................... 60/295
2006/0016441 A1 * 1/2006 Sakaguchi et al. .......... 123/682
2006/0065257 A1 * 3/2006 Katoh ........................ 123/688

FOREIGN PATENT DOCUMENTS

DE 10101006 A 7/2002
DE 10252423 A 5/2004
JP 09-177580 A 7/1997
JP 10-110645 A 4/1998

* cited by examiner

*Primary Examiner*—John T. Kwon
(74) *Attorney, Agent, or Firm*—Global IP Counselors, LLP

(57) ABSTRACT

An engine air-fuel ratio control system is configured to use a rich air-fuel ratio immediately after starting an engine such that the air-fuel ratio converge rapidly toward a stoichiometric value and then afterwards start an air-fuel ratio feedback control. Upon determining an air-fuel ratio sensor is active, a stabilization fuel quantity increasing factor that is a component of a target air-fuel ratio revising coefficient is decreased at a higher rate than the rate used before the air-fuel ratio sensor was determined to be active. Air-fuel ratio feedback control is started when the air-fuel ratio corresponds to a stoichiometric air-fuel ratio. After starting air-fuel ratio feedback control, an unburned fuel quantity compensating value is set based on the stabilization fuel quantity increasing factor in effect at that point in time and added to the target air-fuel ratio revising coefficient while, simultaneously, the stabilization fuel quantity increasing factor is set to zero.

18 Claims, 10 Drawing Sheets

ENGINE AIR-FUEL RATIO CONTROL SYSTEM

CROSS-REFERENCE TO RELATED APPLICATIONS

This application claims priority under 35 U.S.C. § 119 to Japanese Patent Application Nos. 2004-282898, 2004-282900 and 2004-282901. The entire disclosures of Japanese Patent Application Nos. 2004-282898, 2004-282900 and 2004-282901 are hereby incorporated herein by reference.

BACKGROUND OF THE INVENTION

1. Field of the Invention

The present invention generally relates to an engine air-fuel ratio control system. More specifically, the present invention relates to an air-fuel ratio control system configured to run the engine with a rich air-fuel ratio immediately after the engine is started and start feedback control of the air-fuel ratio afterwards such that the air-fuel ratio converge rapidly toward the stoichiometric point.

2. Background Information

Presently, many engine air-fuel ratio control systems that compute and control a fuel injection quantity of an engine. For example, Japanese Laid-Open Patent Publication No. 9-177580 and Japanese Laid-Open Patent Publication No. 10-110645 disclose engine air-fuel ratio control systems that compute and control a fuel injection quantity of an engine. These engine air-fuel ratio control systems set the air-fuel ratio to be enriched immediately after the engine is started and then gradually decreased over time such that the air-fuel ratio gradually converges toward a stoichiometric value. More specifically, a fuel injection quantity of an engine is computed and controlled using a target air-fuel ratio revising coefficient whose constituent values include a stabilization fuel quantity increasing factor that is set such that the air-fuel ratio is richened immediately after the engine is started and gradually decreased over time such that the air-fuel ratio gradually converges toward a stoichiometric value. The calculation of the stabilization fuel quantity increasing factor includes a compensation for the engine rotational speed and the load. Furthermore, an air-fuel ratio feedback revising coefficient that is set such that the air-fuel ratio converges toward a stoichiometric value based on a signal from an air-fuel ratio sensor when an air-fuel ratio feedback control condition is satisfied.

In such engine air-fuel ratio control systems, after the air-fuel ratio sensor is determined to be active, the stabilization fuel quantity increasing factor is set to 0 and the amount by which the stabilization fuel quantity increasing factor was decreased in order to reach 0 (i.e., the value of the stabilization fuel quantity increasing factor at that point in time) is added to the air-fuel ratio feedback revising coefficient, thereby increasing the value of the air-fuel ratio feedback revising coefficient. Then, an air-fuel quantity feedback control is started and an unburned fuel quantity compensating value (unburned fuel quantity balancing value) is then added to the calculation of the target air-fuel ratio revising coefficient. The unburned fuel quantity compensating value serves to ensure stability when a heavy fuel is used, and is set to make the equivalence ratio λ equal 0 when a heavy fuel is used.

In view of the above, it will be apparent to those skilled in the art from this disclosure that there exists a need for an improved engine air-fuel ratio control system. This invention addresses this need in the art as well as other needs, which will become apparent to those skilled in the art from this disclosure.

SUMMARY OF THE INVENTION

It has been discovered that in the engine air-fuel ratio control system described above, the stabilization fuel quantity increasing factor is set to achieve a rich air-fuel ratio before the air-fuel ratio sensor becomes active to ensure a sufficient fuel quantity is delivered to the engine. When the air-fuel ratio becomes active and the air-fuel ratio feedback control starts, the equivalence ratio λ is adjusted to 1 using the air-fuel ratio feedback revising coefficient, but the adjustment is restricted by the gain of the air-fuel ratio feedback control. Consequently, if the stabilization fuel quantity increasing factor is large when the system starts air-fuel ratio feedback control, then the air-fuel ratio will remain rich until it converges to the stoichiometric value.

Additionally, since the unburned fuel quantity compensating value, added after the air-fuel ratio feedback control starts, is set from the standpoint of ensuring stability for heavy fuels, the air-fuel ratio will become rich if a light fuel is used. Thus, the exhaust emissions will be in a degraded state until the equivalence ratio λ is adjusted to 1 using the air-fuel ratio feedback revising coefficient.

The present invention was conceived in view of these issues. One object of the present invention is to provide an engine air-fuel ratio control system that can make the air-fuel ratio converge rapidly toward the stoichiometric point (value).

In order to achieve the aforementioned object, an engine air-fuel ratio control system is provided that basically comprises an air-fuel ratio setting section, an air-fuel ratio sensor detection section, a target air-fuel ratio revision section, and an air-fuel ratio feedback control section. The air-fuel ratio setting section is configured to set an air-fuel ratio for an engine based on at least one engine operating condition. The air-fuel ratio sensor detection section is configured determine a status of an air-fuel ratio sensor. The target air-fuel ratio revision section is configured to set a target air-fuel ratio revising coefficient based on at least a stabilization fuel quantity increasing factor that is set to richen the air-fuel ratio immediately after the engine is started and afterwards to gradually decrease the air-fuel ratio over time to gradually converge towards a stoichiometric value, with the stabilization fuel quantity increasing factor decreasing at a higher rate upon determining the air-fuel ratio sensor to be active than a prior decreasing rate before determining the air-fuel ratio sensor to be active. The air-fuel ratio feedback control section is configured to set an air-fuel ratio feedback revising coefficient that converges the air-fuel ratio towards the stoichiometric value based on a signal from the air-fuel ratio sensor when an air-fuel ratio feedback control condition is satisfied, and to start an air-fuel ratio feedback control upon the air-fuel ratio approximately reaching the stoichiometric value. The target air-fuel ratio revision section is further configured to revise the target air-fuel ratio revising coefficient when the air-fuel ratio feedback control is started by adding an unburned fuel quantity compensating value that is set based on the stabilization fuel quantity increasing factor in effect at that point in time to the target air-fuel ratio revising coefficient while, simultaneously, setting the stabilization fuel quantity increasing factor to zero.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
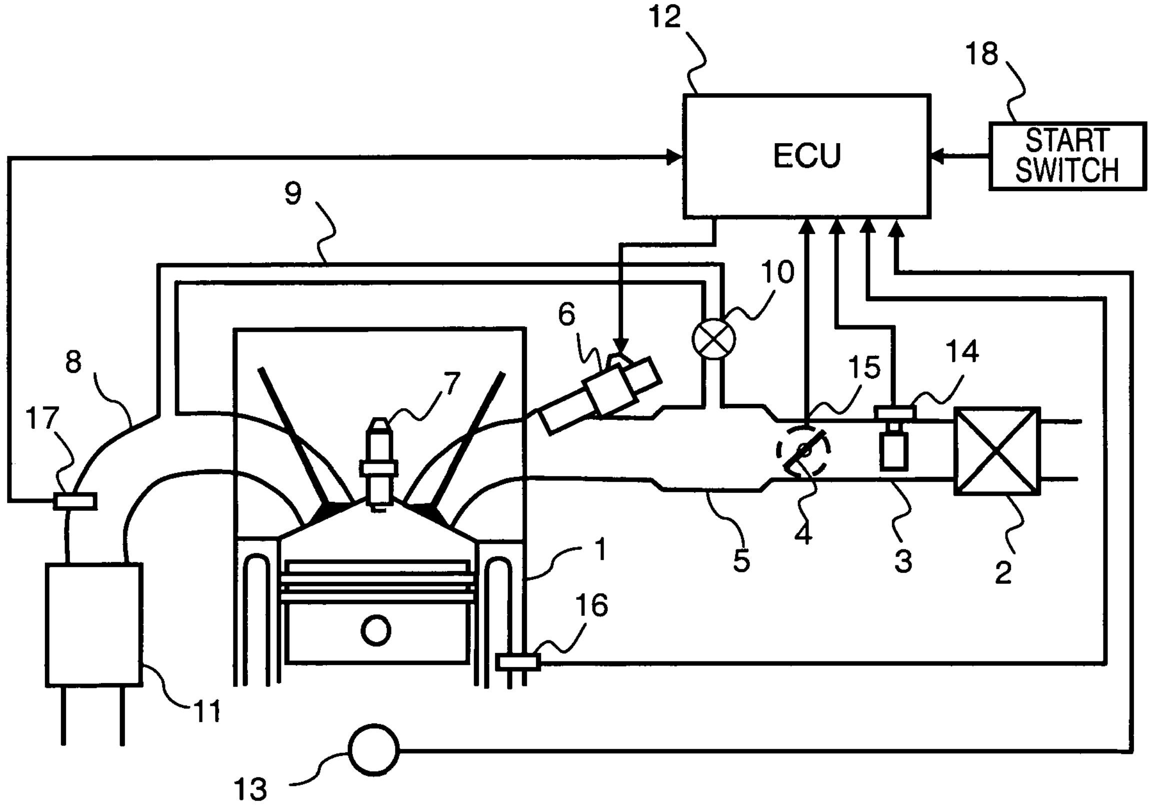
FIG. 1 is a simplified overall schematic view of an internal combustion engine provided with an engine air-fuel ratio control system in accordance with preferred embodiments of the present invention.

Referring initially to FIG. 1, an internal combustion engine 1 is schematically illustrated that is provided with an engine air-fuel ratio control system in accordance with a first embodiment of the present invention. As seen in FIG. 1, air is drawn into the engine 1 through an air cleaner 2 into an air intake duct 3 that has an electronic throttle valve 4 to regulate the air flow an air intake manifold 5. The air intake manifold 5 divides the air flow into several streams for delivering intake air to the combustion chamber of each cylinder of the engine 1. A fuel injection valve 6 is provided in each runner (branch) of the intake manifold 5 such that there is one fuel injection valve 6 for each cylinder. It is also acceptable to arrange the fuel injection valves 6 such that they face directly into the combustion chambers of the respective cylinders, in needed and/or desired.

Each fuel injection valve 6 is an electromagnetic fuel injection valve (injector) configured to open when a solenoid thereof is electrically energized and close when the electricity is stopped.

An engine control unit (ECU) 12 controls the operation of the throttle valve 4 and the fuel injection valve 6 to regulate the air-fuel ratio to the engine 1. Thus, the engine control unit 12 issues a drive pulse signal that electrically controls the throttle valve 4 and a drive pulse signal that electrically energizes the solenoid and opens each fuel injection valve 6. A fuel pump (not shown) pressurizes the fuel and the pressurized fuel is adjusted to a prescribed pressure by a pressure regulator and delivered to the fuel injection valves 6. Thus, the pulse width of the drive pulse signal controls the fuel injection quantity.

A spark plug 7 is provided in the combustion chamber of each cylinder of the engine 1 and serves to produce a spark that ignites and air-fuel mixture, causing the air-fuel mixture to combust.

The exhaust gas from each combustion chamber of the engine 1 is discharged through an exhaust manifold 8. An EGR passage 9 leads from the exhaust manifold 8 to the intake manifold 5 so that a portion of the exhaust gas can be recirculated to the intake manifold 5 through an EGR valve 10. An exhaust gas cleaning catalytic converter 11 is provided in the exhaust passage at a position directly downstream of the exhaust manifold 8.

The engine control unit 12 preferably includes a microcomputer having an air-fuel ratio control program that controls the air intake quantity by regulating the throttle valve 4 and that controls the fuel injection quantity of the fuel injection valves 6, as discussed below, as well as other programs to operate the engine 1. The engine control unit 12 preferably includes other conventional components such as an input interface circuit, an output interface circuit, an analog-to-digital converter, storage devices such as a ROM (Read Only Memory) device and a RAM (Random Access Memory) device, etc. The engine control unit 12 receives input signals from various sensors and executes computer processing (described later) so as to control the operation of the throttle valve 4 and/or the fuel injection valves 6 to adjust the air-fuel ratio. It will be apparent to those skilled in the art from this disclosure that the precise structure and algorithms for the engine control unit 12 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The aforementioned various sensors include, but not limited to, a crank angle sensor 13, an air flow meter 14, a throttle sensor 15, a coolant temperature sensor 16 and an air-fuel ratio sensor (oxygen sensor) 17. The crank angle sensor 13 is configured and arranged to detect the crank angle of the engine 1 based on the rotation of the crankshaft or the camshaft and also to detect the engine rotational speed Ne. The air flow meter 14 is configured and arranged to detect the intake air quantity Qa inside the air intake duct 3. The throttle sensor 15 is configured and arranged to detect the opening degree TVO of the throttle valve 4 (it is acceptable for the throttle sensor 15 to be an idle switch that turns ON when the throttle valve 4 is fully closed). The coolant temperature sensor 16 is configured and arranged to detect the temperature TW of the coolant of the engine 1. The air-fuel ratio sensor (oxygen sensor) 17 is arranged in the collector section of the exhaust manifold and configured to issue a signal indicating if the air-fuel ratio is rich or lean. Instead of using a normal oxygen sensor as the air-fuel ratio sensor 17, it is also acceptable to use a wide-range air-fuel ratio sensor capable of producing a signal that is proportional to the air-fuel ratio. It is also acceptable for the air-fuel ratio sensor 17 to be provided with an internal heating element that is used to raise the temperature of the detection element when the engine is started so as to activate the sensor earlier. The engine control unit 12 also receives a signal from a start switch 18.

The engine control unit 12 primarily forms the engine air-fuel ratio control system of the present invention. Thus, the engine control unit 12 is configured to comprise an air-fuel ratio setting section, an air-fuel ratio sensor detection section, target air-fuel ratio revision section, and an air-fuel ratio feedback control section. The air-fuel ratio setting section configured to set an air-fuel ratio for the engine 1 based on at least one engine operating condition, e.g. set a basic fuel injection quantity (basic injection pulse width) Tp for the engine 1 based on at least one engine operating condition as explained below. The air-fuel ratio sensor 17 detection section is configured determine a status of the air-fuel ratio sensor 17 as explained below. The target air-fuel ratio revision section configured to set a target air-fuel ratio revising coefficient TFBYA based on at least a stabilization fuel quantity increasing factor KSTB that is set to richen the air-fuel ratio immediately after the engine 1 is started and afterwards to gradually decrease the air-fuel ratio over time to gradually converge towards a stoichiometric value, with the stabilization fuel quantity increasing factor decreasing at a higher rate upon determining the air-fuel ratio sensor 17 to be active than a prior decreasing rate before determining the air-fuel ratio sensor 17 to be active as explained below. The air-fuel ratio feedback control section is configured to set an air-fuel ratio feedback revising coefficient ALPHA that converges the air-fuel ratio towards the stoichiometric value based on a signal from the air-fuel ratio sensor 17 when an air-fuel ratio feedback control condition is satisfied, and to start an air-fuel ratio feedback control upon the air-fuel ratio approximately reaching the stoichiometric value as explained below. The target air-fuel ratio revision section is further configured to revise the target air-fuel ratio revising coefficient TFBYA when the air-fuel ratio feedback control is started by adding an unburned fuel quantity compensating value KUB that is set based on the stabilization fuel quantity increasing factor KSTB in effect at that point in time to the target air-fuel ratio revising coefficient TFBYA while, simultaneously, setting the stabilization fuel quantity increasing factor KSTB to zero as explained below.

With the present invention, the equivalence ratio λ can be adjusted to 1 at the maximum speed allowable in view of the operating performance of the engine without being restricted by the normal gain of the air-fuel ratio feedback control (i.e., the gain that is in effect in normal operating regions). Also, although the stability fuel quantity increasing value KSTB in effect when the air-fuel ratio reaches the stoichiometric value varies depending on the properties and state of the fuel, the system learns about the variation and sets the unburned fuel quantity compensating value KUB accordingly. As a result, the unburned fuel quantity compensating value KUB can be set to a value that is optimum in view of the properties and state of the fuel and degradation of the exhaust emissions can be avoided even when a light fuel is used.

The computation of the fuel injection quantity Ti by the engine control unit 12 will now be described.

First, the engine control unit 12 reads in the intake air quantity Qa detected by the air flow meter 14 and the engine rotational speed Ne detected by the crank angle sensor 13 and calculates the basic fuel injection quantity (basic injection pulse width) Tp corresponding to a stoichiometric air-fuel ratio using the equation shown below. In the equation, the term K is a constant.

$$Tp=K\times Qa/Ne$$

The engine control unit 12 then reads in the target air-fuel ratio revising coefficient TFBYA and the air-fuel ratio feedback revising coefficient ALPHA, which are set separately. The engine control unit 12 then calculates the final fuel injection quantity (injection pulse width) Ti using the equation shown below.

$$Ti=Tp\times TFBYA\times \mathrm{ALPHA}$$

The reference values (values corresponding to a stoichiometric air-fuel ratio) of the target air-fuel ratio revising coefficient TFBYA and the air-fuel ratio feedback revising coefficient ALPHA are both 1.

The computation of the fuel injection quantity (injection pulse width) Ti also includes a transient compensation based on the throttle valve opening degree TVO and an arithmetic addition of a non-effective injection pulse width based on the battery voltage, but these factors have been omitted for the sake of brevity.

Once the fuel injection quantity Ti is calculated, the engine control unit 12 sends a drive pulse signal having a pulse width corresponding to the value of the fuel injection quantity Ti to the fuel injection valve 6 of each cylinder at a prescribed timing synchronized with the engine rotation, thereby executing fuel injection.

The setting of the target air-fuel ratio revising coefficient TFBYA will now be described.

The target air-fuel ratio revising coefficient TFBYA is calculated by multiplying a basic target air-fuel ratio revising coefficient TFBYA0 by a compensation coefficient THOS.

$$TFBYA=TFBYA0\times THOS$$

The basic target air-fuel ratio revising coefficient TFBYA0 is a target air-fuel ratio assigned to each operating region determined based on the engine rotational speed and the engine load using a map that plots the basic target air-fuel ratio revising coefficient TFBYA0 versus the engine rotational speed and the load (e.g., target torque). The basic target air-fuel ratio revising coefficient TFBYA0 equals 1 in normal (stoichiometric) operating regions (regions other than a high rotational speed/high load region) because the engine is operated with a stoichiometric air fuel ratio. Meanwhile, TFBYA0 is larger than 1 in a high rotational speed/high load (rich) operating region (KMR region) because the engine is operated with a rich air-fuel ratio.

The compensation coefficient THOS is calculated using the equation shown below. The reference value is 1 and such values as a stabilization fuel quantity increasing factor KSTB and an unburned fuel quantity compensating value KUB are added to the reference value to calculate the compensation coefficient THOS as well as other factors as needed (not shown for the sake of simplicity).

$$THOS=1+KSTB+KUB+\ldots$$

The stabilization fuel quantity increasing factor KSTB is set such that the air-fuel ratio is richened immediately after the engine 1 is started, and afterwards the a stabilization fuel quantity increasing factor KSTB is gradually decreased over time such that the air-fuel ratio gradually converges toward the stoichiometric value. Preferably, the calculation of the stabilization fuel quantity increasing factor KSTB is set to compensate for the engine rotational speed and the load (e.g., target torque). The degree to which the stabilization fuel quantity increasing factor KSTB makes the air-fuel ratio more rich also depends on the coolant temperature, i.e., the lower the coolant temperature, the more the air-fuel ratio is richened.

Once the stabilization fuel quantity increasing factor KSTB is set to 0, the unburned fuel quantity compensating value KUB is set in such a manner that stability can be ensured even if a heavy fuel is being used. In one application of this embodiment, the unburned fuel quantity compensating value KUB is contrived to make λ equal 1 when a heavy fuel is used.

The setting of the air-fuel ratio feedback revising coefficient ALPHA will now be described.

The air-fuel ratio feedback revising coefficient ALPHA is increased and decreased in the following manner. When the air-fuel ratio feedback control conditions are satisfied (at least one condition being that the air-fuel ratio sensor 17 is active), then the engine control unit 12 begins checking the output signal from the air-fuel ratio sensor 17 to determine if the air fuel ratio is rich or lean. If a rich-to-lean transition point is reached (i.e., if the current output value is lean, but the previous output value was rich), the engine control unit 12 increases the air-fuel ratio feedback revising coefficient ALPHA by a proportional amount (proportion gain) P that is set to a comparatively large value (i.e., ALPHA=ALPHA+P). Thereafter, so long as the air-fuel ratio continues to be lean, the engine control unit 12 increases the air-fuel ratio feedback revising coefficient ALPHA by a very small integral amount (integral gain) I (i.e., ALPHA=ALPHA+I).

Conversely, if a lean-to-rich transition point is reached (i.e., if the current output value is rich but the previous output value was lean), then the engine control unit 12 decreases the air-fuel ratio feedback revising coefficient ALPHA by a proportional amount (proportion gain) P that is set to a comparatively large value (i.e., ALPHA=ALPHA−P). Thereafter, so long as the air-fuel ratio continues to be rich, the engine control unit 12 decreases the air-fuel ratio feedback revising coefficient ALPHA by a very small integral amount (integral gain) I (i.e., ALPHA=ALPHA−I).

When the air-fuel ratio feedback control conditions are not satisfied, the air-fuel ratio feedback revising coefficient ALPHA is held at the reference value 1 or at the last value it had when air-fuel ratio feedback control ended.

Figure 2:
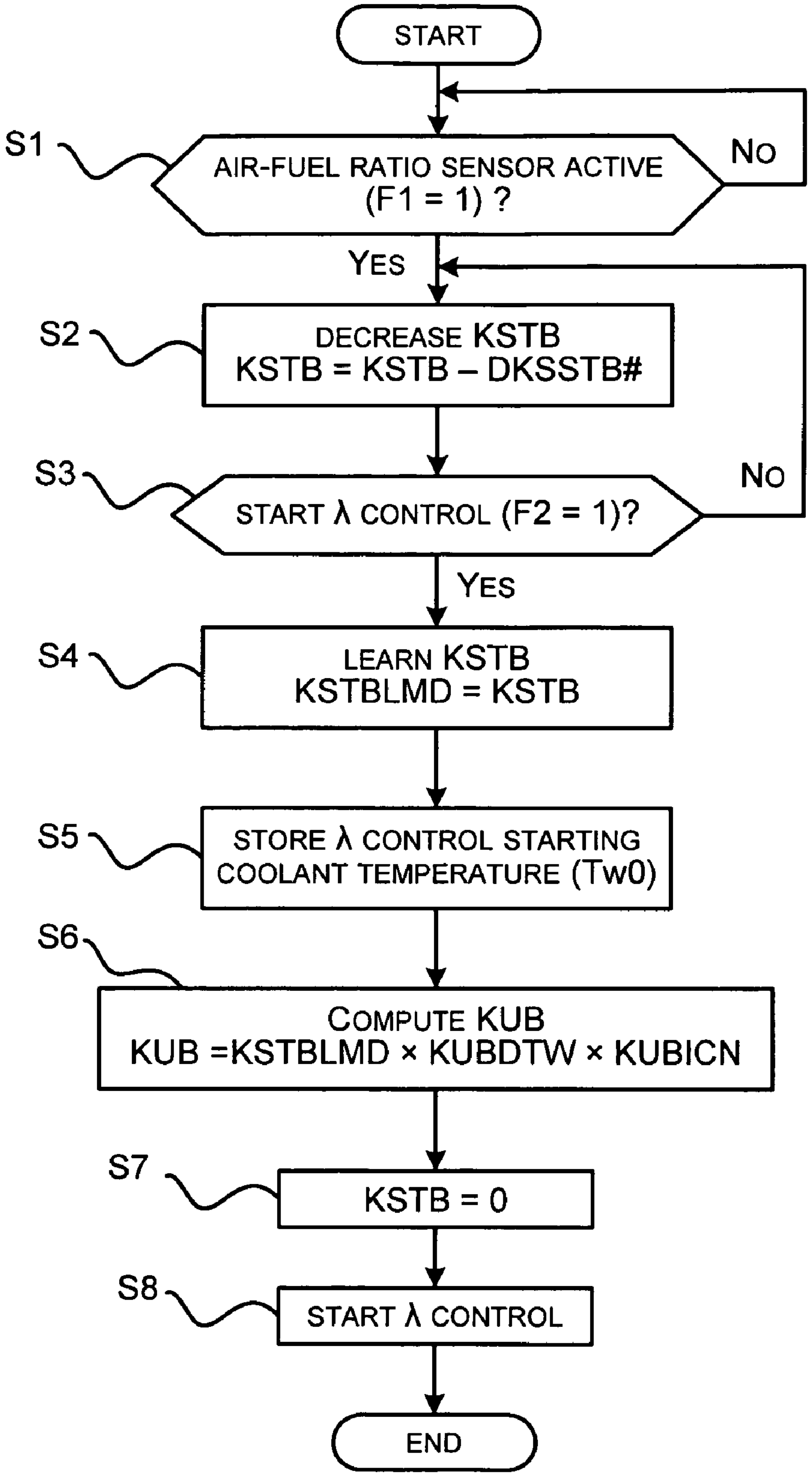
FIG. 2 is a flowchart of a control routine executed by the engine air-fuel ratio control system used to carry out the steps of a post-start air-fuel ratio control in accordance with a first embodiment of the present invention.
Figure 5:
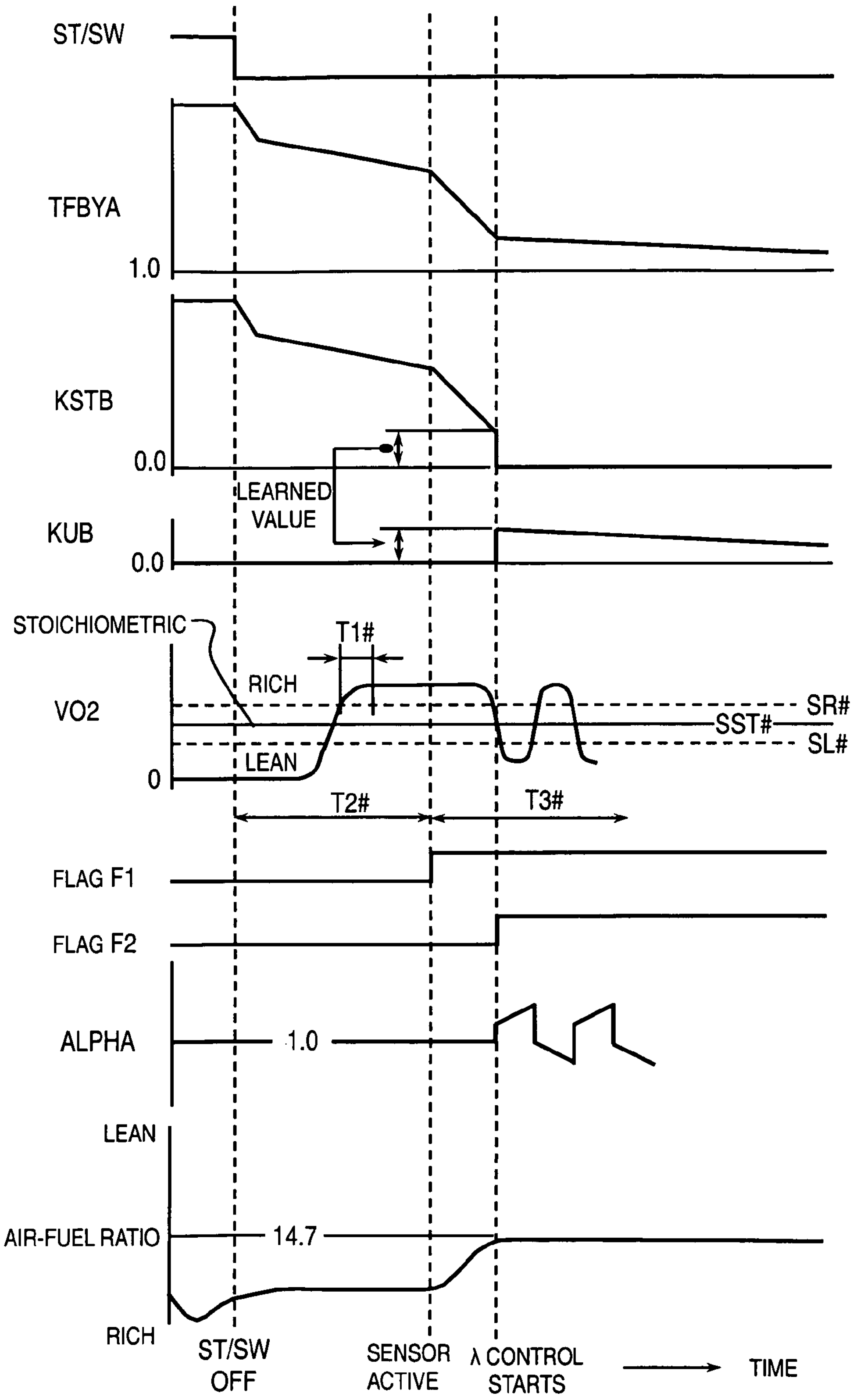
FIG. 5 is a first time chart illustrating the post-start air-fuel ratio control in accordance with each of the embodiments of the present invention.

FIG. 2 is a flowchart showing the steps of the air-fuel ratio control from immediately after the engine 1 is started (i.e., when the start switch status changes from ON to OFF) until the air-fuel ratio feedback control starts. FIG. 5 is a time chart corresponding to the same control steps.

In step S1, after the engine 1 is started, the engine control unit 12 determines if the air-fuel ratio sensor 17 is active.

Figure 3:
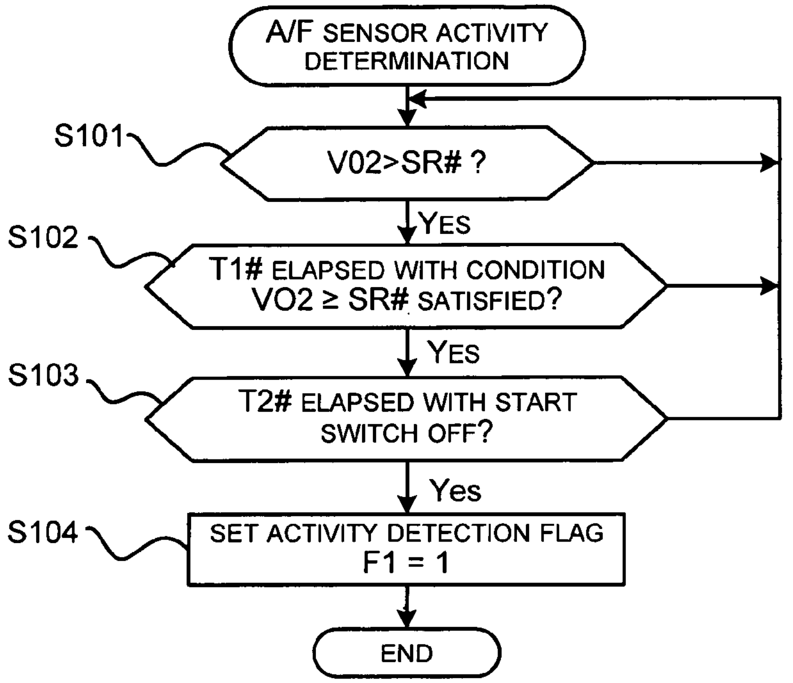
FIG. 3 is a flowchart of a control routine executed by the engine air-fuel ratio control system used to determine if the air-fuel ratio sensor is active in accordance with the preferred embodiments of the present invention.

The activity determination is executed according to the flowchart shown in FIG. 3. In step S101, the engine control unit 12 determines if the output VO2 of the air-fuel ratio sensor 17 is equal to or larger than a predetermined rich activity level SR#. If the result of step S101 is YES, then the engine control unit 12 proceeds to step S102 and determines if a prescribed amount of time T1# has elapsed with the condition VO2≧SR# continuously satisfied. If the result of step S102 is YES, then the engine control unit 12 proceeds to step S103 where it determines if a prescribed amount of time T2# has elapsed since the start switch (ST/SW) turned OFF. If the result of step S103 is YES, i.e., if the determination results of the steps S101 to S103 are all YES, then the engine control unit 12 proceeds to step S104 where an activity detection flag F1 is set to 1 for indicating that the air-fuel ratio sensor 17 has been determined to be active.

Thus, in step S1, the engine control unit 12 determines if the activity detection flag F1 is 1.

During the period when the activity detection flag F1 is 0, i.e., from immediately after the engine 1 is started until the air-fuel ratio sensor 17 is determined to be active, the stabilization fuel quantity increasing factor KSTB is set such that the air-fuel ratio is richened to a degree in accordance with the coolant temperature (i.e., the lower the coolant temperature, the more the air-fuel ratio is richened). After the initial rich setting, the stabilization fuel quantity increasing factor KSTB is gradually decreased over time such that the air-fuel ratio gradually converges toward the stoichiometric value. Since the target air-fuel ratio revising coefficient TFBYA is at least partially determined by the stabilization fuel quantity increasing factor KSTB (because KUB=0), the target air-fuel ratio revising coefficient TFBYA is adjusted in the same manner, i.e., set to a rich value in accordance with the coolant temperature and then made to gradually converge toward the stoichiometric value. During this period, the air-fuel ratio feedback revising coefficient ALPHA is held at the reference value 1.

When the activity detection flag F1 changes to 1, i.e., when the air-fuel ratio sensor 17 is determined to be active, the engine control unit 12 proceeds to step S2.

In step S2, the engine control unit 12 begins decreasing the stabilization fuel quantity increasing factor KSTB at a higher rate than the rate at which it decreased the stabilization fuel quantity increasing factor KSTB before the air-fuel ratio sensor 17 was determined to be active. More specifically, the stabilization fuel quantity increasing factor KSTB is reduced by a prescribed reduction amount (DKSSTB#) per unit time (see equation below).

$$KSTB=KSTB-DKSSTB\#$$

Figure 4:
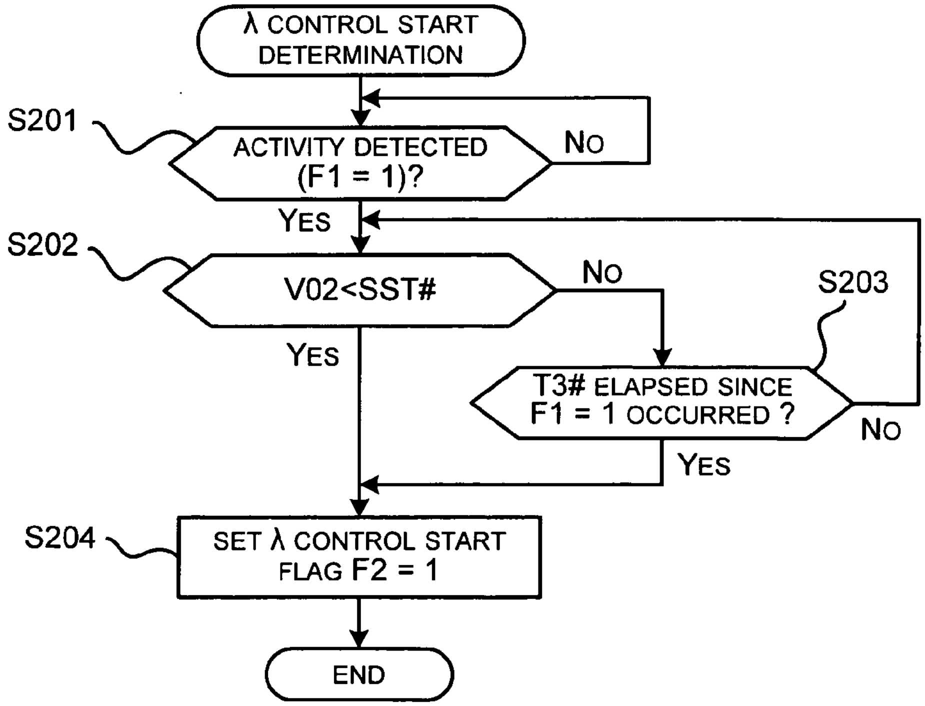
FIG. 4 is a flowchart of a control routine executed by the engine air-fuel ratio control system used to determine if the λ control should be started in accordance with the preferred embodiments of the present invention.

In step S3, the engine control unit 12 determines if the start conditions for air-fuel ratio feedback control (λ control) are satisfied. The determination as to whether or not the conditions for air-fuel ratio feedback control (λ control) are satisfied is made in accordance with the flowchart of FIG. 4. In step S201, the engine control unit 12 determines if the value activity determination flag F1 for the air-fuel ratio sensor 17 is 1. If the result of step S201 is YES, then the engine control unit 12 proceeds to step S202 where it determines if the output VO2 of the air-fuel ratio sensor 17 has reached a value SST# corresponding to a stoichiometric air-fuel ratio (VO2≦SST#).

If the result of step S202 is YES, then the engine control unit 12 determines that the conditions for the air-fuel ratio feedback control (λ control) are satisfied and proceeds to step S204, where it sets the λ control start flag F2 to 1. If the result of step S202 is NO, then the engine control unit 12 proceeds to step S203 and determines if a prescribed amount of time T3# has elapsed since it was determined that the air-fuel ratio sensor 17 is active (i.e., since F1=1). Here, too, if the result is YES, the engine control unit 12 determines that the conditions for the air-fuel ratio feedback control (λ control) are satisfied and proceeds to step S204, where it sets the λ control start flag F2 to 1.

Thus, in step S3, the engine control unit 12 determines if the value of the λ control start flag F2 is 1.

During the period when the λ control start flag F2 is 0, i.e., from the point in time when it is determined that the air-fuel ratio sensor 17 is active until the air-fuel ratio feedback control is started, the engine control unit 12 decreases the stabilization fuel quantity increasing factor KSTB until it reaches 0, the decreasing being executed at a higher rate (DKSSTB#) than the rate at which the stabilization fuel quantity increasing factor KSTB was decreased before the air-fuel ratio sensor 17 was determined to be active. Since the target air-fuel ratio revising coefficient TFBYA is primarily determined by the stabilization fuel quantity increasing factor KSTB (because KUB=0), the target air-fuel ratio revising coefficient TFBYA is decreased in the same manner. During this period, the air-fuel ratio feedback revising coefficient ALPHA is held at the reference value 1.

When the λ control start flag F2 changes to 1, i.e., when the start conditions for air-fuel ratio feedback control are satisfied, the engine control unit 12 proceeds to steps S4 to S8 to start air-fuel ratio feedback control.

In step S4, the engine control unit 12 learns the current stabilization fuel quantity increasing factor KSTB and stores it as a learned value KSTBLMD (KSTBLMD=KSTB). The learned value KSTBLMD will be used as the basic value of the unburned fuel quantity compensating value KUB.

In step S5, the engine control unit 12 detects the current coolant temperature TW and stores it as the λ control starting coolant temperature TW0 (TW0=TW).

In step S6, the engine control unit 12 computes the unburned fuel quantity compensating value KUB using the following equation:

$$KUB=KSTBLMD \times KUBDTW \times KUBICN$$

In other words, the learned value KSTBLMD of the stability fuel quantity increasing value is multiplied by compensation coefficients KUBDTW and KUBICN in order to set the unburned fuel quantity compensating value KUB.

The compensation coefficient KUBDTW is calculated using the following equation:

$$KUBDTW=(KBUZTW\#-TW)/(KUBZTW\#-TW0)$$

In this equation, the term KBUZTW# is the maximum coolant temperature at which compensation for unburned fuel is executed.

Thus, KUBDTW equals 1 when λ control first starts because TW equals TW0. After λ controls starts, KUBDTW decreases as the coolant temperature TW increases and reaches 0 when the coolant temperature TW reaches the maximum value KUBZTW#.

The compensation coefficient KUBICN is a value obtained by using a linear interpolation of a map MKUBIN in accordance with the engine rotational speed Ne and the cylinder intake air filling efficiency ITAC.

In step S7, the stabilization fuel quantity increasing factor KSTB is set to 0 unconditionally (KSTB=0).

Thus, since target air-fuel ratio revising coefficient TFBYA is calculated with the equation TFBYA=TFBYA0×(1+KSTB+KUB+ . . . ), the target air-fuel ratio revising coefficient TFBYA is approximately equal to 1+KUB (TFBYA≈1+KUB) so long as TFBYA0 is 1.

In step S8, the engine control unit 12 starts air-fuel ratio feedback control (λ control). More specifically, the engine control unit 12 executes proportional and integral control to increase and decrease the setting value of the air-fuel ratio feedback revising coefficient ALPHA.

The control routine executed by the engine control unit 12 in this embodiment (FIG. 5) will now be described in comparison with the conventional post-start air-fuel ratio control shown in the time chart of FIG. 8 ("post-start" meaning control that is executed after the engine is started).

In the conventional post-start air-fuel ratio control (FIG. 8), after the air-fuel ratio sensor 17 is determined to be active, the stabilization fuel quantity increasing factor KSTB is set to 0 and the amount by which the stabilization fuel quantity increasing factor KSTB was decreased in order to reach 0 (i.e., the value of the stabilization fuel quantity increasing factor KSTB at that point in time) is added to the air-fuel ratio feedback revising coefficient ALPHA, thereby increasing the value of ALPHA. Then, an air-fuel quantity feedback control (λ control) is started and the unburned fuel quantity compensating value (unburned fuel quantity balancing value) KUB is newly added to the calculation of the target air-fuel ratio revising coefficient TFBYA.

The convergence of the air-fuel ratio toward the stoichiometric value is affected by the variation of the air-fuel ratio feedback revising coefficient ALPHA. Thus, since the variation of the air-fuel ratio feedback revising coefficient ALPHA is dominated by the integral gain (I), the convergence toward the stoichiometric value will become slow if the integral gain cannot be set small enough due to the demands of other regions.

Also, since the unburned fuel quantity compensating value KUB is set to accommodate heavy fuels from the viewpoint of the operating performance of the engine, if a light fuel is used, the air-fuel ratio will drift to richer values temporarily until the feedback control causes the air-fuel ratio to converge. Consequently, there are times when the exhaust emissions are not sufficiently reduced.

Conversely, with the control executed by this embodiment (FIG. 5), after the air-fuel ratio sensor 17 has been determined to be active, the stabilization fuel quantity increasing factor KSTB is decreased at a higher rate than the rate at which it was decreased before the air-fuel ratio sensor 17 was determined to be active and the air-fuel ratio feedback revising coefficient ALPHA is held at the reference value (1) until the air-fuel ratio reaches the stoichiometric value. At the point in time when the air-fuel ratio reaches the stoichiometric value, the air-fuel ratio feedback control (λ control) is started. Additionally, when the air-fuel ratio feedback control is started, the unburned fuel quantity compensating value KUB is set based on the stabilization fuel quantity increasing factor KSTB in effect at that point in time and added to the target air-fuel ratio revising coefficient TFBYA. Meanwhile, simultaneously, the stabilization fuel quantity increasing factor KSTB is set to zero.

Thus, during the period from when the air-fuel sensor is determined to be active until the air-fuel ratio feedback control starts, the air-fuel ratio feedback revising coefficient ALPHA is clamped at 1 and the target air-fuel ratio revising coefficient TFBYA (actually the stabilization fuel quantity increasing factor KSTB) is reduced until λ equals 1. As a result, the air-fuel ratio can be brought to the stoichiometric value rapidly regardless of the gain of the air-fuel ratio feedback revising coefficient ALPHA.

Also, although the stabilization fuel quantity increasing factor KSTB in effect when the air-fuel ratio reaches the stoichiometric value varies depending on the properties and state of the fuel (heavy or light), the system learns about the variation and sets the unburned fuel quantity compensating value KUB accordingly. As a result, the unburned fuel quantity compensating value KUB can be set to a value that is optimum in view of the properties and state of the fuel and degradation of the exhaust emissions can be avoided even when a light fuel is used.

Figure 6:
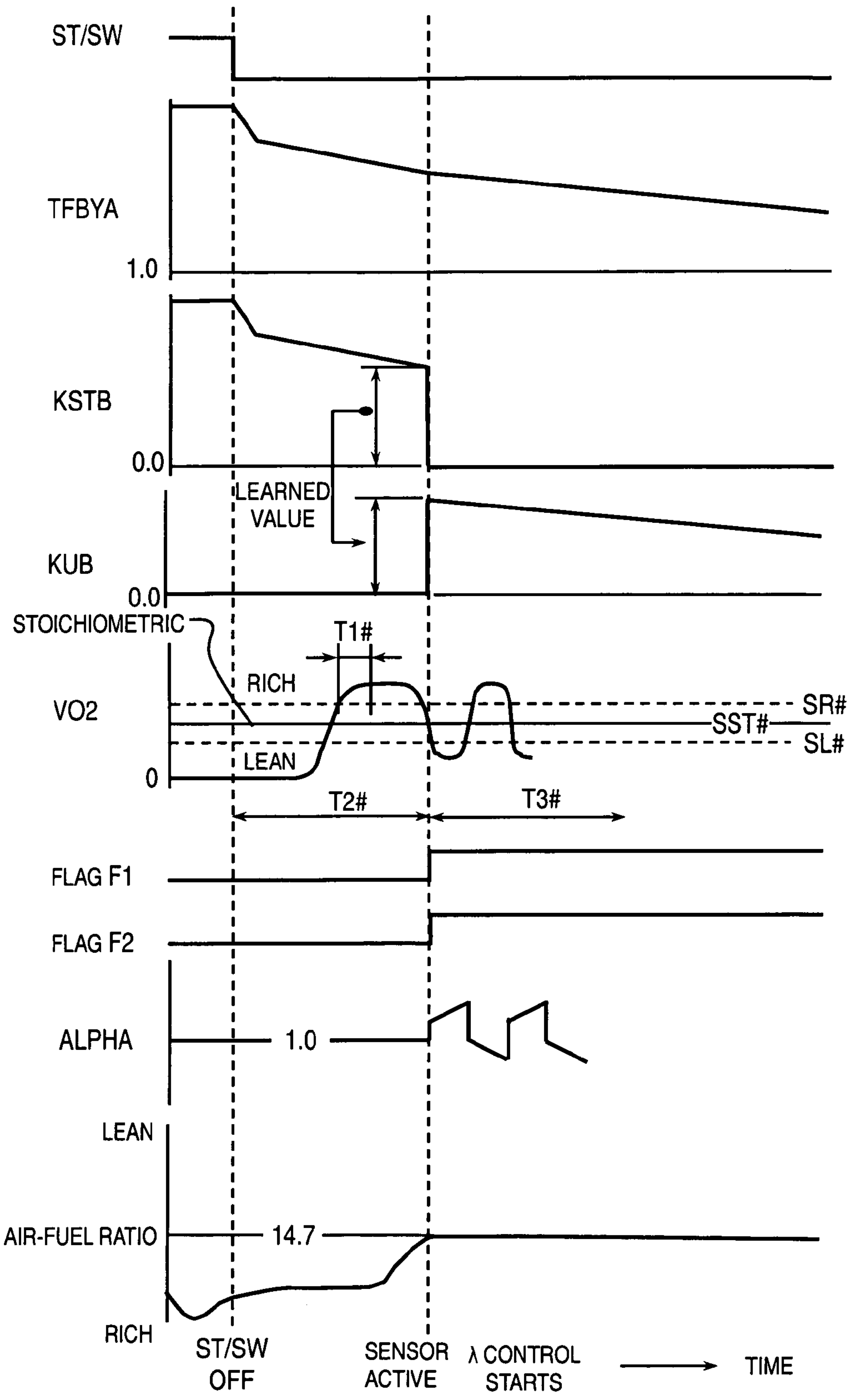
FIG. 6 is a second time chart illustrating the post-start air-fuel ratio control in accordance with the first embodiment of the present invention.

FIG. 6 is a time chart illustrating a case in which the air-fuel ratio has already reached the stoichiometric value when the air-fuel ratio sensor 17 is determined to be active and the air-fuel ratio feedback control starts simultaneously with the determination that the air-fuel ratio sensor 17 is active (i.e., a case in which the fuel is heavier than in the case illustrated in FIG. 5). In such a case, the unburned fuel quantity compensating value KUB is set to a large value because the stabilization fuel quantity increasing factor KSTB is large when the air-fuel ratio feedback control starts.

Figure 7:
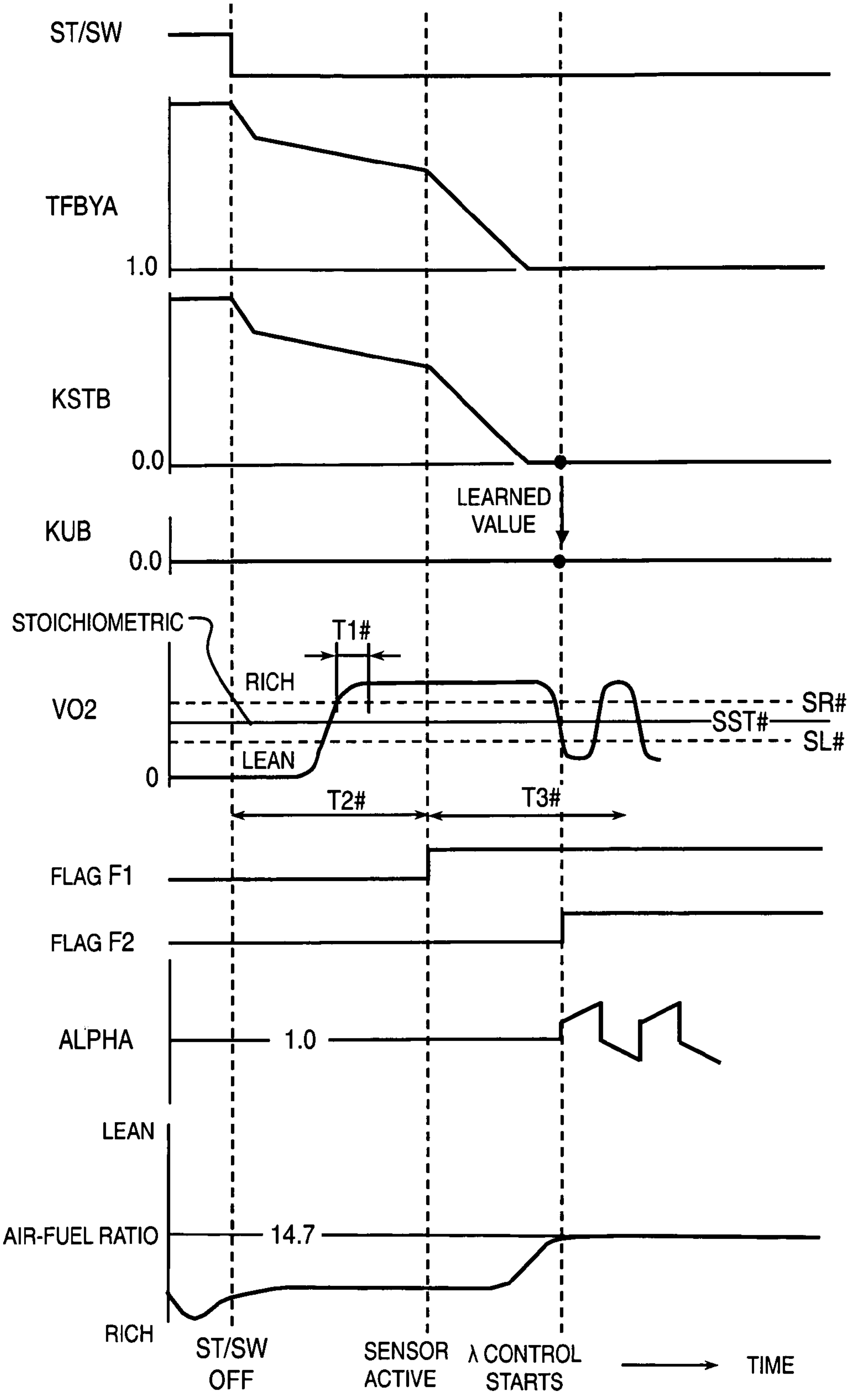
FIG. 7 is a third time chart illustrating the post-start air-fuel ratio control in accordance with the first embodiment of the present invention.

FIG. 7 is a time chart illustrating a case in which when the air-fuel ratio reaches the stoichiometric value after the air-fuel ratio sensor 17 is determined to be active and the air-fuel ratio feedback control starts, the stabilization fuel quantity increasing factor KSTB is already 0 (i.e., a case in which the fuel is lighter than in the case illustrated in FIG. 5). In such a case, the unburned fuel quantity compensating value KUB is set to 0 because the stabilization fuel quantity increasing factor KSTB is 0 when the air-fuel ratio feedback control starts. Thus, there is no compensation for unburned fuel.

With this embodiment, the unburned fuel quantity compensating value KUB is set by applying a compensation operation to the learned value of the stabilization fuel quantity increasing factor KSTB (which is the basic value of the unburned fuel quantity compensating value KUB) such that the unburned fuel quantity compensating value KUB decreases as the coolant temperature TW increases. As a result, the unburned fuel quantity compensating value KUB can be decreased in an appropriate fashion as the coolant temperature increases.

With this embodiment, an accurate determination of whether or not the air-fuel ratio sensor 17 is active can be made because the determination is made based on the output (VO2) of the air-fuel ratio sensor 17 and the amount of time (T2#) elapsed since the engine was started.

With this embodiment, if the output of the air-fuel ratio sensor 17 has not reached a value (SST#) corresponding to a stoichiometric air-fuel ratio after a prescribed amount of time (T3#) has elapsed since the air-fuel ratio sensor 17 was determined to be active, the air-fuel ratio feedback control starts regardless of the air-fuel ratio. As a result, even if the air-fuel ratio continues to be rich for some reason, the feedback control can be started reliably and the air-fuel ratio can be brought to the stoichiometric value by the feedback control.

Thus, the engine air-ratio control system of the present invention is configured such that after the air-fuel ratio sensor 17 has been determined to be active, the stabilization fuel quantity increasing factor KSTB is decreased at a higher rate than the rate at which it was decreased before the air-fuel ratio sensor 17 was determined to be active and, afterwards, the air-fuel ratio feedback control is started after the air-fuel ratio reaches the stoichiometric value. As a result, the equivalence ratio $\lambda$ can be adjusted to 1 at the maximum speed allowable in view of the operating performance of the engine without being restricted by the normal gain of the air-fuel ratio feedback control (i.e., the gain that is in effect in normal operating regions).

Additionally, when the air-fuel ratio feedback control is started, an unburned fuel quantity compensating value KUB is set based on the stabilization fuel quantity increasing factor KSTB at that point in time and added to the target air-fuel ratio revising coefficient TFBYA while, simultaneously, the stabilization fuel quantity increasing factor KSTB is set to zero.

Also, although the stabilization fuel quantity increasing factor KSTB in effect when the air-fuel ratio reaches the stoichiometric value varies depending on the properties and state of the fuel, the system learns about the variation and sets the unburned fuel quantity compensating value KUB accordingly. As a result, the unburned fuel quantity compensating value KUB can be set to a value that is optimum in view of the properties and state of the fuel and degradation of the exhaust emissions can be avoided even when a light fuel is used.

Second Embodiment

Figure 9:
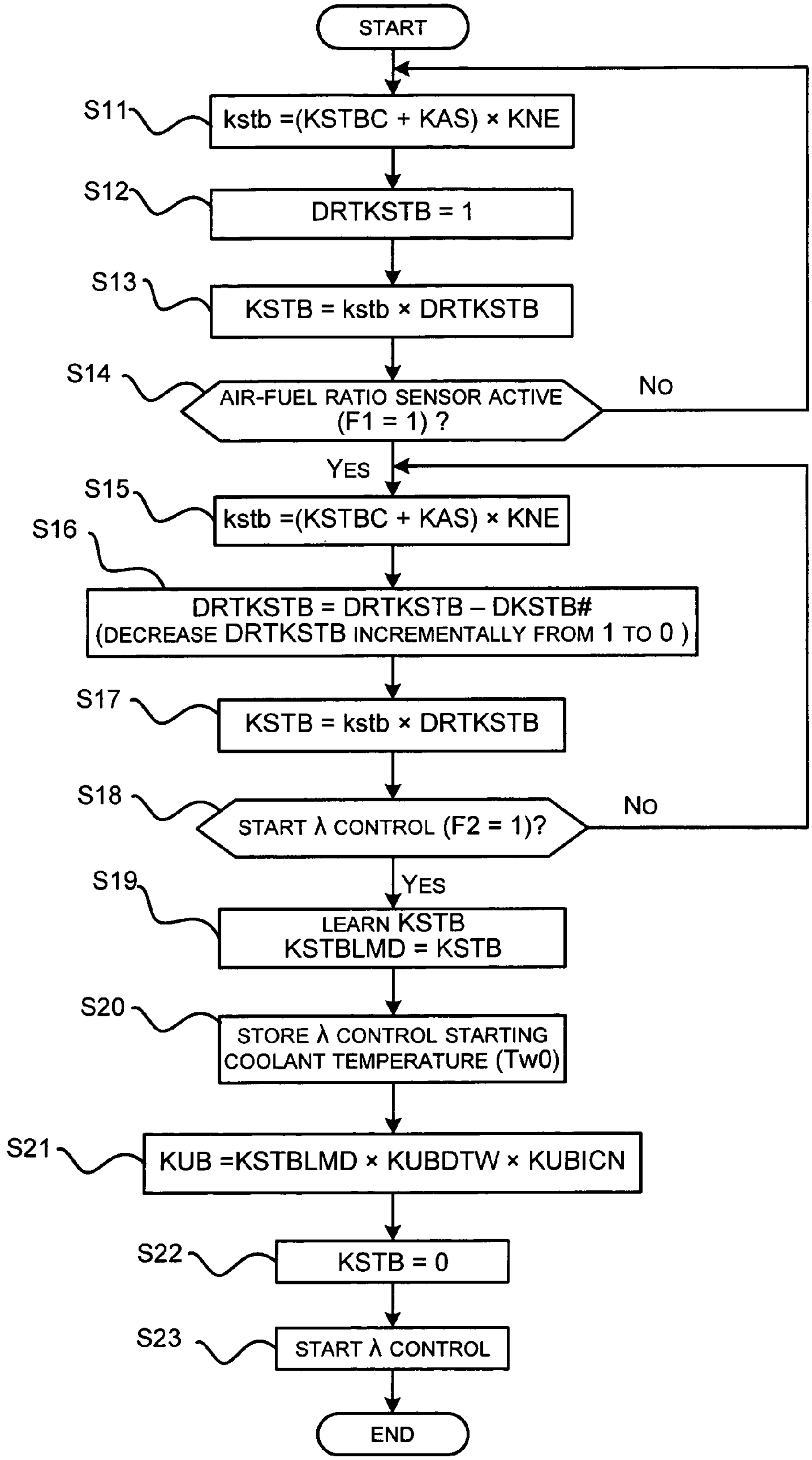
FIG. 9 is a flowchart showing the steps of a post-start air-fuel ratio control a second embodiment of the present invention.
Figure 10:
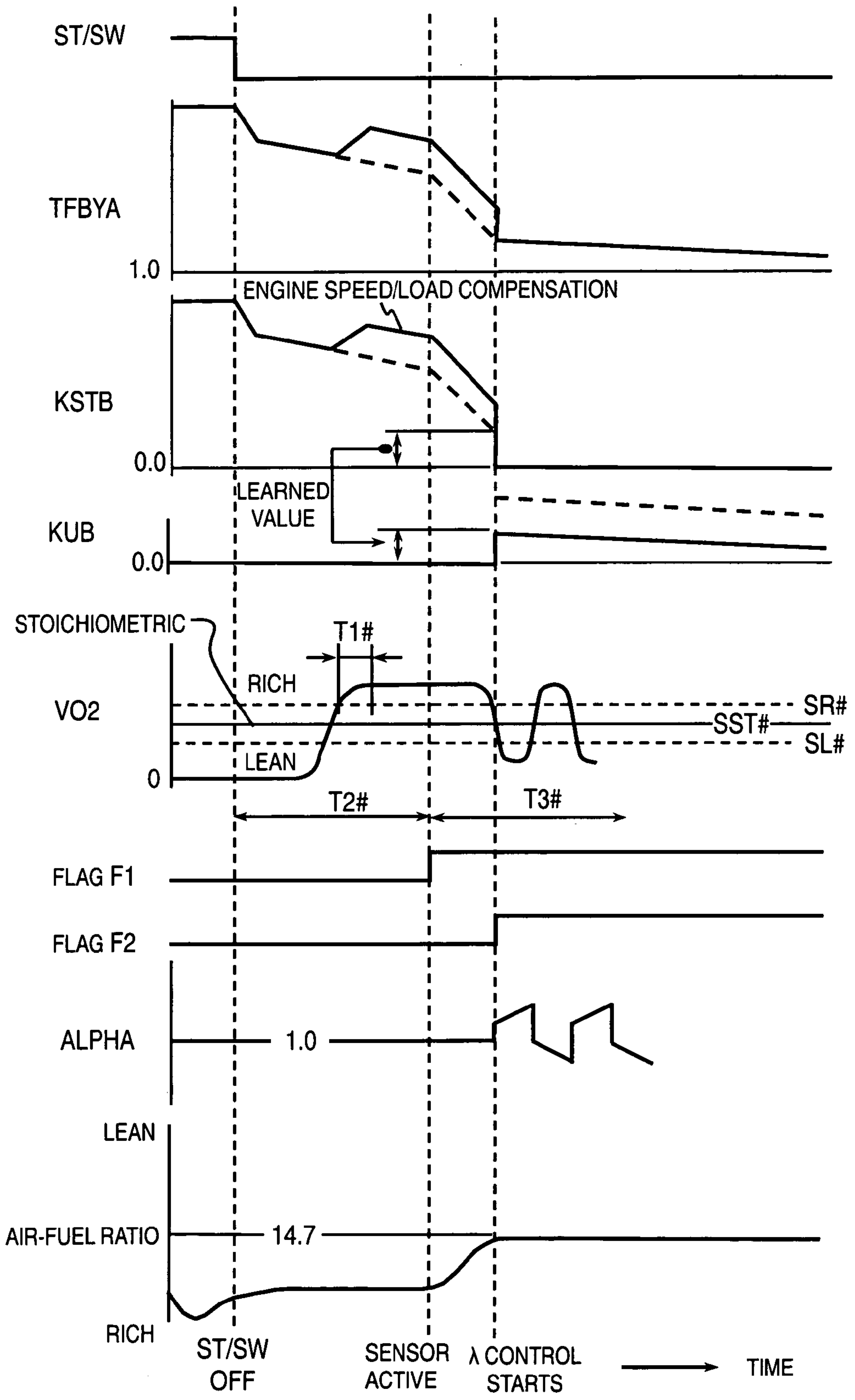
FIG. 10 is a time chart illustrating a case in which an engine speed/load compensation amount is executed in accordance with the second embodiment of the present invention.

Referring now to FIGS. 9 and 10, an alternate control program will now be discussed for the engine control unit 12 of the engine 1 that is schematically illustrated in FIG. 1. Since only the programming is different between the first and second embodiments, the parts or steps of the second embodiment that are identical to the parts or steps of the first embodiment will be given the same reference numerals as the parts of the first embodiment. Moreover, the descriptions of the parts or steps of the second embodiment that are identical to the parts or steps of the first embodiment may be omitted for the sake of brevity. In other words, unless otherwise specified, the rest of the configurations of the engine 1 and the engine control unit 12 in this second embodiment are the same as the configuration of the first embodiment.

The computation of the fuel injection quantity Ti by the engine control unit 12 and the setting of the target air-fuel ratio revising coefficient TFBYA by the engine control unit 12 are the same as the first embodiment, except as explained below. Thus, the calculation of the stabilization fuel quantity increasing factor KSTB which includes a compensation for the engine rotational speed and the load (e.g., target torque) is the same as the first embodiment, except as explained below.

The setting of the air-fuel ratio feedback revising coefficient ALPHA will now be described in accordance.

FIG. 9 is a flowchart showing the steps of the air-fuel ratio control from immediately after the engine is started (i.e., when the start switch status changes from ON to OFF) until the air-fuel ratio feedback control starts. FIG. 5 is a time chart corresponding to the same control steps.

In step S11, the engine control unit 12 calculates a basic value kstb using the equation shown below. The basic value kstb will be used to calculate the stabilization fuel quantity increasing factor KSTB. The basic value kstb is set such that the air-fuel ratio is richened immediately after the engine 1 is started and afterwards is gradually decreased such that the air-fuel ratio gradually converges toward a stoichiometric value. The calculation of the basic value kstb includes a compensation for the engine rotational speed and the load.

$$kstb=(KSTBC+KAS)\times KNE$$

The term KSTBC is set to such a value that the air-fuel ratio is rich immediately after the engine is started and, afterwards, is gradually decreased such that the air-fuel ratio gradually converges toward the stoichiometric value.

The term KAS is gradually decreased such that, immediately after the engine is started, the value of KSTB converges to KSTBC from the increased value it has at the time of engine starting.

The coefficient KNE is an engine speed/load compensation coefficient or amount for revising kstb in accordance with the engine rotational speed and the load. The coefficient KNE is set to 1 when the engine is idling and to a value larger than 1 when the engine is not idling. The larger the engine rotational speed and the load are, the larger the value to which the coefficient KNE is set. In actual practice, the engine speed/load compensation amount (KNE) is calculated as a portion of KSTBC and KAS, but here it is shown as an engine speed/load compensation coefficient KNE that is independent from KSTBC and KAS in order to facilitate ease of understanding.

In step S13, as shown in the equation below, the engine control unit 12 calculates the stabilization fuel quantity increasing factor KSTB by multiplying the basic value kstb by the reduction coefficient DRTKSTB (here DRTKSTB=1). (The basic value kstb is set such that the air-fuel ratio is richened immediately after the engine is started and afterwards is gradually decreased such that the air-fuel ratio gradually converges toward a stoichiometric value. The calculation of the basic value kstb includes a compensation for the engine rotational speed and the load.)

$$KSTB = kstb \times DRTKSTB$$

Here, since the reduction coefficient DRTKSTB is 1, the stabilization fuel quantity increasing factor KSTB equals basic value kstb.

In step S14, the engine control unit 12 determines if the air-fuel ratio sensor 17 is active. The activity determination is executed according to the flowchart shown in FIG. 3 as discussed above. Thus, in step S14, the engine control unit 12 determines if the activity detection flag F1 is 1.

If the result of step S14 is NO, i.e., if the value of the activity detection flag F1 is 0, the engine control unit 12 returns to step S1 and repeats the calculation of the stabilization fuel quantity increasing factor KSTB in steps S11 to S13.

During the period from immediately after the engine 1 is started until the air-fuel ratio sensor 17 is determined to be active, the stabilization fuel quantity increasing factor KSTB is set such that the air-fuel ratio is richened to a degree in accordance with the coolant temperature (i.e., the lower the coolant temperature, the more the air-fuel ratio is richened). After the initial rich setting, the stabilization fuel quantity increasing factor KSTB is gradually decreased over time such that the air-fuel ratio gradually converges toward the stoichiometric value and, simultaneously, the stabilization fuel quantity increasing factor KSTB is revised in accordance with the engine rotational speed and the load (i.e., the calculation of the stabilization fuel quantity increasing factor includes a compensation for the engine rotational speed and the load). Since the target air-fuel ratio revising coefficient TFBYA is determined by the stabilization fuel quantity increasing factor KSTB (because KUB=0), the target air-fuel ratio revising coefficient TFBYA is set in the same manner, i.e., set to a rich value in accordance with the coolant temperature and then made to gradually converge toward the stoichiometric value. During this period, the air-fuel ratio feedback revising coefficient ALPHA is held at the reference value 1.

If the result of step S14 is YES, i.e., if the activity detection flag F1 is 1 (i.e., if the air-fuel ratio sensor 17 is determined to be active), the engine control unit 12 proceeds to step S5.

In step S15, similarly to step S11, the basic value kstb is calculated using the equation below in order to calculate the stabilization fuel quantity increasing factor KSTB.

$$kstb = (KSTBC + KAS) \times KNE$$

In step S16, the engine control unit 12 decreases the reduction coefficient DRTKSTB by a prescribed value DKSTB#. Since step S16 is executed once per prescribed amount of time, the reduction DRTKSTB is decreased incrementally once per unit time (see equation below) until it is decreased from 1 to 0.

$$DRTKSTB = DRTKSTB - DKSTB\#$$

In step S17, similarly to step S13, the engine control unit 12 calculates the stabilization fuel quantity increasing factor KSTB by multiplying the basic value kstb by the reduction coefficient DRTKSTB (which is in the process of being decreased from 1 to 0), as shown in the equation below.

$$KSTB = kstb \times DRTKSTB$$

Since the value of DRTKSTB is gradually reduced from 1 (the value of DRTKSTB before the sensor is determined to be active) to 0 after the air-fuel ratio sensor 17 is determined to be active, the rate at which the stabilization fuel quantity increasing factor KSTB is decreased is larger after the air-fuel ratio sensor 17 is determined to be active than before the air-fuel ratio sensor 17 is determined to be active.

In step S18, the engine control unit 12 the engine control unit 12 determines if the start conditions for air-fuel ratio feedback control (λ control) are satisfied. The determination as to whether or not the conditions for air-fuel ratio feedback control (λ control) are satisfied is made in accordance with the flowchart of FIG. 4 as discussed above. Thus, in step S18, the engine control unit 12 determines if the value of the λ control start flag F2 is 1.

If the result of step S18 is NO, i.e., if the value of the λ control start flag F2 is 0, the engine control unit 12 returns to step S15 and repeats steps S15 to S17.

During the period from the point in time when it is determined that the air-fuel ratio sensor 17 is active until the air-fuel ratio feedback control is started, the engine control unit 12 decreases the stabilization fuel quantity increasing factor KSTB until it reaches 0, the decreasing being executed at a higher rate than the rate at which the stabilization fuel quantity increasing factor KSTB was decreased before the air-fuel ratio sensor 17 was determined to be active. Since the target air-fuel ratio revising coefficient TFBYA is determined by the stabilization fuel quantity increasing factor KSTB (because KUB=0), the target air-fuel ratio revising coefficient TFBYA is decreased in the same manner. During this period, too, the air-fuel ratio feedback revising coefficient ALPHA is held at the reference value, 1.

When the result of step S18 changes to YES, i.e., when the λ control start flag F2 changes to 1 (i.e., when the start conditions for air-fuel ratio feedback control are satisfied), the engine control unit 12 proceeds to steps S19 to S23 to start air-fuel ratio feedback control.

In step S19, the engine control unit 12 divides the current stabilization fuel quantity increasing factor KSTB by the engine speed/load compensating coefficient KNE to remove the revision based on the engine rotational speed and the load from the current stabilization fuel quantity increasing factor KSTB and stores the resulting value (KSTB/KNE) as a learned value KSTBLMD (KSTBLMD=KSTB/KNE).

The learned value KSTBLMD will be used as the basic value of the unburned fuel quantity compensating value KUB.

In step S20, the engine control unit 12 detects the current coolant temperature TW and stores it as the λ control starting coolant temperature TW0 (TW0=TW).

In step S21, the engine control unit 12 computes the unburned fuel quantity compensating value KUB using the following equation:

$$KUB=KSTBLMD\times KUBDTW\times KUBICN$$

In other words, the learned value KSTBLMD of the stabilization fuel quantity increasing factor is multiplied by compensation coefficients KUBDTW and KUBICN in order to set the unburned fuel quantity compensating value KUB.

The compensation coefficient KUBDTW is calculated using the following equation:

$$KUBDTW=(KBUZTW\#-TW)/(KUBZTW\#-TW0)$$

The term KBUZTW# is the maximum coolant temperature at which compensation for unburned fuel is executed.

Thus, the term KUBDTW equals 1 when λ control first starts because TW equals TW0. After λ controls starts, the term KUBDTW decreases as the coolant temperature TW increases and reaches 0 when the coolant temperature TW reaches the maximum value KUBZTW#.

The compensation coefficient KUBICN is a value obtained by means of a linear interpolation of a map MKUBIN in accordance with the engine rotational speed Ne and the cylinder intake air filling efficiency ITAC.

In step S22, the stabilization fuel quantity increasing factor KSTB is set to 0 unconditionally (KSTB=0).

Thus, since target air-fuel ratio revising coefficient TFBYA is calculated with the equation TFBYA=TFBYA0×(1+KSTB+KUB+ . . . ), TFBYA is approximately equal to 1+KUB (TFBYA≈1+KUB) so long as TFBYA0 is 1.

In step S23, the engine control unit 12 starts air-fuel ratio feedback control (λ control). More specifically, the engine control unit 12 executes proportional and integral control to increase and decrease the setting value of the air-fuel ratio feedback revising coefficient ALPHA.

Figure 8:
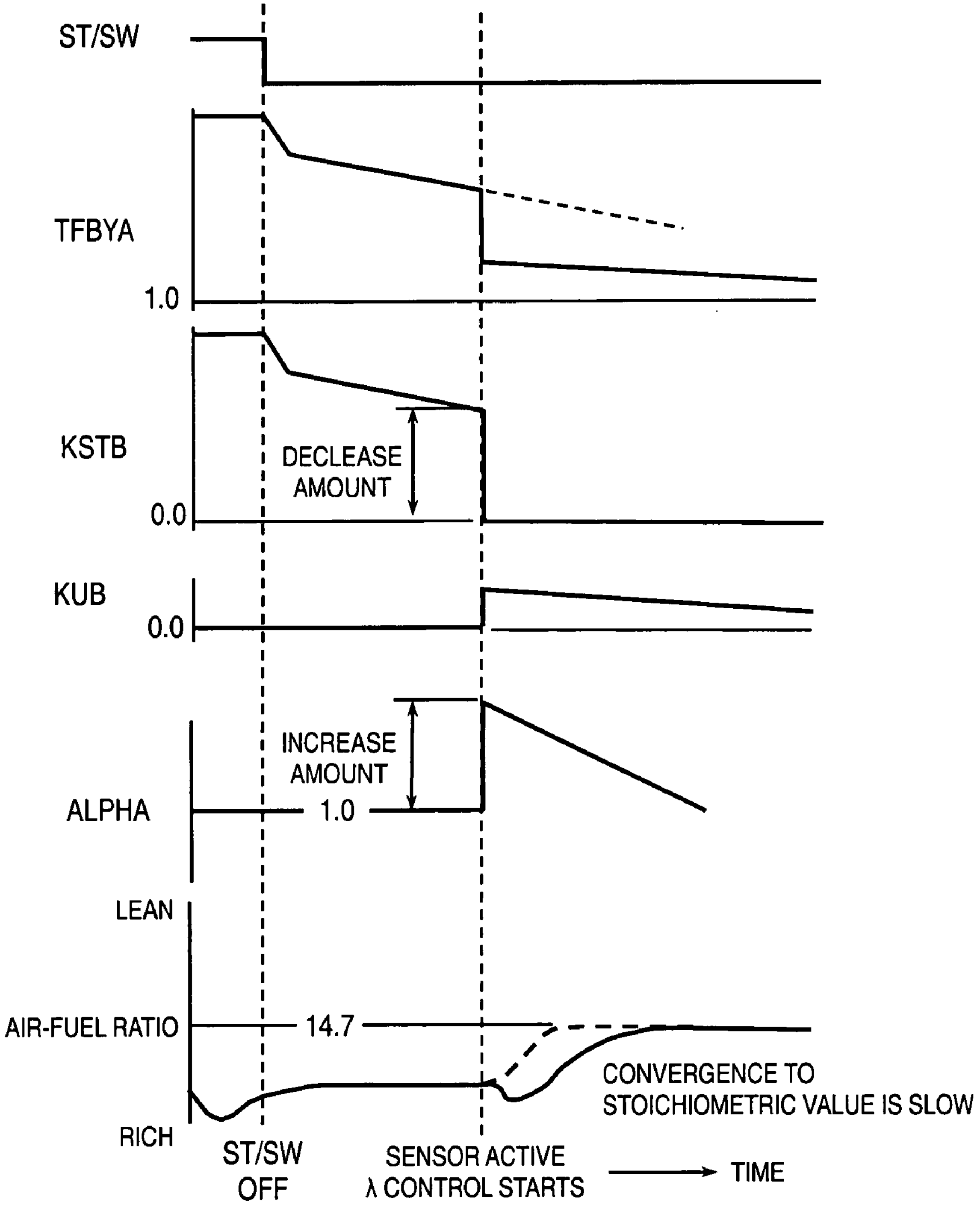
FIG. 8 is a time chart illustrating a conventional post-start air-fuel ratio control.

The basic control executed by this embodiment is the same as the first embodiment as shown by the time chart of FIG. 5, which can be compared with the conventional post-start air-fuel ratio control shown in the time chart of FIG. 8.

FIG. 10 is a time chart illustrating a case in which an engine speed/load compensation amount is executed in accordance with this second embodiment.

When the air-fuel ratio feedback control (λ control) starts, the stabilization fuel quantity increasing factor KSTB used to set the unburned fuel quantity compensating value KUB. However, since an engine speed/load compensation amount (compensation for the engine rotational speed and the load) is included in the calculation of the stabilization fuel quantity increasing factor KSTB, if the stabilization fuel quantity increasing factor KSTB in effect at the point in time when λ control starts is learned (stored) and used as is, the calculated unburned fuel quantity compensating value KUB will be larger than necessary and it will take longer for the air-fuel ratio feedback control to converge to a stoichiometric air-fuel ratio. Consequently, the air-fuel ratio will remain rich for long time.

Therefore, in second embodiment of the present invention, the unburned fuel quantity compensating value KUB is set based on the value (KSTB/KNE) obtained by removing the engine speed/load compensation amount from the stabilization fuel quantity increasing factor KSTB in effect immediately before the air-fuel ratio feedback control starts. As a result, a situation in which the air-fuel ratio becomes rich because the unburned fuel quantity compensating value KUB is excessively large due to being set based on an incorrect learned value that includes compensation for the rotational speed and the load of the engine can be prevented.

With this second embodiment, the unburned fuel quantity compensating value KUB is set by establishing an initial value (KSTB/KNE) obtained by removing the revision based on the engine rotational speed and the load from the stabilization fuel quantity increasing factor KSTB and then applying a compensation operation to the initial value such that the unburned fuel quantity compensating value KUB decreases as the coolant temperature increases. As a result, the unburned fuel quantity compensating value KUB can be decreased in an appropriate fashion as the coolant temperature increases.

With this embodiment, the stabilization fuel quantity increasing factor KSTB is calculated by multiplying a reduction coefficient DRTKSTB by a value kstb that is set such that the air-fuel ratio is richened immediately after the engine 1 is started and afterwards is gradually decreased such that the air-fuel ratio gradually converges toward a stoichiometric value, the calculation of the value kstb including a compensation for the engine rotational speed and the load. The reduction coefficient DRTKSTB is set to 1 before the air-fuel ratio sensor 17 is determined to be active and is decreased at a constant rate from 1 to 0 after the air-fuel ratio sensor 17 is determined to be active. As a result, even if the rotational speed and/or load of the engine changes while the stabilization fuel quantity increasing factor KSTB is being decreased, the change in rotational speed and/or load of the engine can be compensated for while still accomplishing the decreasing (reduction) of the stabilization fuel quantity increasing factor KSTB.

In other words, during the period after the air-fuel ratio sensor 17 is determined to be active when the stabilization fuel quantity increasing factor KSTB is being decreased at a faster rate than the rate at which it was decreased before the air-fuel ratio sensor 17 was determined to be active, a compensation for the rotational speed and the load of the engine 1 cannot be accomplished if the system is designed such that the decreasing of the stabilization fuel quantity increasing factor KSTB during the period is accomplished by repeatedly (incrementally) subtracting a prescribed value from an initial value that is equal to the stabilization fuel quantity increasing factor KSTB in effect at the point in time when the air-fuel ratio sensor 17 was determined to be active. That is, with such a system, changes in the rotational speed and the load of the engine 1 can no longer be taken into after the air-fuel ratio sensor 17 is determined to be active. However, with this embodiment, it is possible to accomplish an engine speed/load compensation amount both before and after the air-fuel ratio sensor 17 is determined to be active because a basic value kstb of the stabilization fuel quantity increasing factor is calculated in the same manner both before and after the air-fuel ratio sensor 17 is determined to be active and the stabilization fuel quantity increasing factor KSTB is calculated by multiplying the basic value kstb by a reduction coefficient DRTKSTB. Thus, the stabilization fuel quantity increasing factor KSTB can be decreased properly while also compensating for the rotational speed and the load of the engine.

With this embodiment, an accurate determination of whether or not the air-fuel ratio sensor 17 is active can be made because the determination is made based on the output (VO2) of the air-fuel ratio sensor 17 and the amount of time (T2#) elapsed since the engine was started.

With this embodiment, if the output of the air-fuel ratio sensor 17 has not reached a value (SST#) corresponding to a stoichiometric air-fuel ratio after a prescribed amount of time (T3#) has elapsed since the air-fuel ratio sensor 17 was determined to be active, the air-fuel ratio feedback control starts regardless of the air-fuel ratio. As a result, even if the air-fuel ratio continues to be rich for some reason, the feedback control can be started reliably and the air-fuel ratio can be brought to the stoichiometric value by the feedback control.

Third Embodiment

Figure 11:
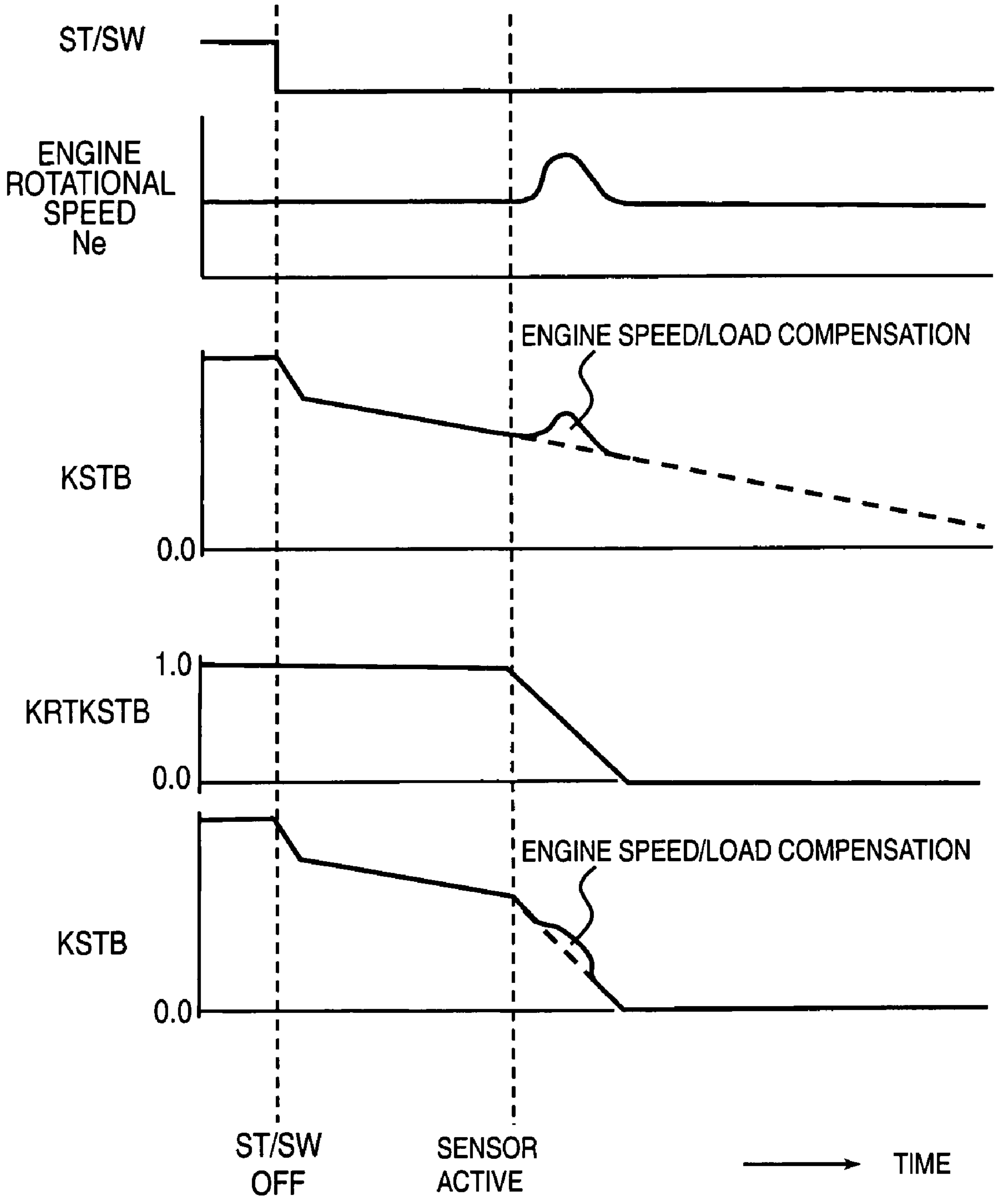
FIG. 11 is a time chart illustrating a case in which an engine speed/load compensation amount is executed in accordance with a third embodiment of the present invention.

Referring now to FIG. 11, an alternate control program will now be discussed for the engine control unit 12 of the engine 1 that is schematically illustrated in FIG. 1. Since only the programming is different between the first, second and third embodiments, the parts or steps of the third embodiment that are identical to the parts or steps of the first and/or second embodiments will be given the same reference numerals as the parts of the first embodiment. Moreover, the descriptions of the parts or steps of the third embodiment that are identical to the parts or steps of the first and/or second embodiments may be omitted for the sake of brevity. In other words, unless otherwise specified, the rest of the configurations of the engine 1 and the engine control unit 12 in this third embodiment are the same as the configurations of the first and/or second embodiments.

The computation of the fuel injection quantity Ti by the engine control unit 12 and the setting of the target air-fuel ratio revising coefficient TFBYA by the engine control unit 12 are the same as the second embodiment, except as explained below. Thus, the calculation of the stabilization fuel quantity increasing factor KSTB which includes a compensation for the engine rotational speed and the load (e.g., target torque) is the same as the second embodiment, except as explained below.

FIG. 9 is a flowchart showing the steps of the air-fuel ratio control from immediately after the engine 1 is started (i.e., when the start switch status changes from ON to OFF) until the air-fuel ratio feedback control starts. FIG. 5 is a time chart corresponding to the same control steps.

The basic control executed by this embodiment as shown by the time chart of FIG. 5 can be compared with the conventional post-start air-fuel ratio control shown in the time chart of FIG. 8 in the same manner as the first and second embodiments.

Additionally, during the period when the stabilization fuel quantity increasing factor KSTB is decreased at a higher rate than the rate at which it was decreased before the air-fuel ratio sensor 17 was determined to be active, a reduction coefficient DRTKSTB whose value decreases over time is multiplied by the stabilization fuel quantity increasing factor KSTB and the calculation of the stabilization fuel quantity increasing factor KSTB continues to include a compensation amount for the rotational speed and the load of the engine. As a result, even if the rotational speed and/or load of the engine changes while the stabilization fuel quantity increasing factor KSTB is being decreased, the change in rotational speed and/or load of the engine can be compensated for while still accomplishing the decreasing (reduction) of the stabilization fuel quantity increasing factor KSTB.

In other words, during the period after the air-fuel ratio sensor 17 is determined to be active when the stabilization fuel quantity increasing factor KSTB is being decreased at a faster rate than the rate at which it was decreased before the air-fuel ratio sensor 17 was determined to be active, a compensation for the rotational speed and the load of the engine cannot be accomplished if the system is designed such that the decreasing of the stabilization fuel quantity increasing factor KSTB during the period is accomplished by repeatedly (incrementally) subtracting a prescribed value from an initial value that is equal to the stabilization fuel quantity increasing factor KSTB in effect at the point in time when the air-fuel ratio sensor 17 was determined to be active. That is, with such a system, changes in the rotational speed and the load of the engine can no longer be taken into after the air-fuel ratio sensor 17 is determined to be active. However, with this embodiment, it is possible to accomplish an engine speed/load compensation amount both before and after the air-fuel ratio sensor 17 is determined to be active because a basic value kstb of the stabilization fuel quantity increasing factor is calculated in the same manner both before and after the air-fuel ratio sensor 17 is determined to be active and the stabilization fuel quantity increasing factor KSTB is calculated by multiplying the basic value kstb by a reduction coefficient DRTKSTB. Thus, the stabilization fuel quantity increasing factor KSTB can be decreased properly while also compensating for the rotational speed and the load of the engine.

FIG. 11 is a time chart illustrating a case in which an engine speed/load compensation amount (a compensation for an increase in engine rotational speed Ne) is executed in accordance with this third embodiment during the period when the stabilization fuel quantity increasing factor KSTB is being reduced.

In such a case, the basic value kstb of the stabilization fuel quantity increasing factor KSTB includes an engine speed/load compensation amount and the stabilization fuel quantity increasing factor KSTB is calculated by multiplying the reduction coefficient DRTKSTB by the basic value kstb. Thus, the stabilization fuel quantity increasing factor KSTB can be decreased reliably while simultaneously being revised to compensate for the rotational speed and the load of the engine.

With this embodiment, the stabilization fuel quantity increasing factor KSTB is calculated by multiplying a reduction coefficient DRTKSTB by a value kstb that is set such that the air-fuel ratio is richened immediately after the engine is started and afterwards is gradually decreased such that the air-fuel ratio gradually converges toward a stoichiometric value, the calculation of the value kstb including a compensation for the engine rotational speed and the load. The reduction coefficient DRTKSTB is set to 1 before the air-fuel ratio sensor 17 is determined to be active and is decreased at a constant rate from 1 to 0 after the air-fuel ratio sensor 17 is determined to be active. As a result, the different control schemes required before the air-fuel ratio sensor 17 is determined to be active and after the air-fuel ratio sensor 17 is determined to be active can be accomplished by merely changing the reduction coefficient DRTKSTB.

This embodiment achieves an advantageous effect by calculating the unburned fuel quantity compensating value KUB based on the value (KSTB/KNE) obtained by removing the revision based on the engine rotational speed and the load from the stabilization fuel quantity increasing factor KSTB. Namely, when the air-fuel ratio feedback control (λ control) starts, if the stabilization fuel quantity increasing factor KSTB in effect at that point in time is learned (stored) and used as is (i.e., with the engine speed/load compensation amount included) to calculate the unburned fuel quantity compensating value KUB, the calculated unburned fuel quantity compensating value KUB will be larger than necessary and it will take longer for the air-fuel ratio feedback control to converge to a stoichiometric air-fuel ratio. Consequently, the air-fuel ratio will remain rich for long time. Therefore, in this embodiment, the unburned fuel quantity compensating value KUB is set based on the value (KSTB/KNE) obtained by removing the engine speed/load compensation amount from the stabilization fuel quantity increasing factor KSTB. As a result, a situation in which the air-fuel ratio becomes rich because the unburned fuel quantity compensating value KUB is excessively large due to being set based on an incorrect learned value that includes compensation for the rotational speed and the load of the engine can be prevented.

With this embodiment, the unburned fuel quantity compensating value KUB is set by establishing an initial value (KSTB/KNE) obtained by removing the revision based on the engine rotational speed and the load from the stabilization fuel quantity increasing factor KSTB and then applying a compensation operation to the initial value such that the unburned fuel quantity compensating value KUB decreases as the coolant temperature increases. As a result, the unburned fuel quantity compensating value KUB can be decreased in an appropriate fashion as the coolant temperature increases.

With this embodiment, an accurate determination of whether or not the air-fuel ratio sensor 17 is active can be made because the determination is made based on the output (VO2) of the air-fuel ratio sensor 17 and the amount of time (T2#) elapsed since the engine was started.

With this embodiment, if the output of the air-fuel ratio sensor 17 has not reached a value (SST#) corresponding to a stoichiometric air-fuel ratio after a prescribed amount of time (T3#) has elapsed since the air-fuel ratio sensor 17 was determined to be active, the air-fuel ratio feedback control starts regardless of the air-fuel ratio. As a result, even if the air-fuel ratio continues to be rich for some reason, the feedback control can be started reliably and the air-fuel ratio can be brought to the stoichiometric value by the feedback control.

As used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An engine air-fuel ratio control system comprising:

an air-fuel ratio setting section configured to set an air-fuel ratio for an engine based on at least one engine operating condition;

an air-fuel ratio sensor detection section configured determine a status of an air-fuel ratio sensor;

a target air-fuel ratio revision section configured to set a target air-fuel ratio revising coefficient based on at least a stabilization fuel quantity increasing factor that is set to richen the air-fuel ratio immediately after the engine is started and afterwards to gradually decrease the air-fuel ratio over time to gradually converge towards a stoichiometric value, with the stabilization fuel quantity increasing factor decreasing at a higher rate upon determining the air-fuel ratio sensor to be active than a prior decreasing rate before determining the air-fuel ratio sensor to be active; and an air-fuel ratio feedback control section configured to set an air-fuel ratio feedback revising coefficient that converges the air-fuel ratio towards the stoichiometric value based on a signal from the air-fuel ratio sensor when an air-fuel ratio feedback control condition is satisfied, and to start an air-fuel ratio feedback control upon the air-fuel ratio approximately reaching the stoichiometric value, the target air-fuel ratio revision section being further configured to revise the target air-fuel ratio revising coefficient when the air-fuel ratio feedback control is started by adding an unburned fuel quantity compensating value that is set based on the stabilization fuel quantity increasing factor in effect at that point in time to the target air-fuel ratio revising coefficient while, simultaneously, setting the stabilization fuel quantity increasing factor to zero.

2. The engine air-fuel ratio control system as recited in claim 1, wherein the target air-fuel ratio revision section is further configured to set the unburned fuel quantity compensating value to a value obtained by applying a compensation operation to a learned value of the stability fuel quantity increasing value such that the unburned fuel quantity compensating value decreases as the coolant temperature TW increases.

3. The engine air-fuel ratio control system as recited in claim 1, wherein the air-fuel ratio sensor detection section is further configured to determine the air-fuel ratio sensor to be active based on an output of the air-fuel ratio sensor and an amount of time elapsed since the engine was started.

4. The engine air-fuel ratio control system as recited in claim 1, wherein the target air-fuel ratio revision section is further configured to start the air-fuel ratio feedback control after a prescribed amount of time has elapsed since the air-fuel ratio sensor was determined to be active, regardless of the air-fuel ratio.

5. The engine air-fuel ratio control system as recited in claim 1, wherein the target air-fuel ratio revision section is further configured to calculate the stabilization fuel quantity increasing factor using an engine rotational speed/load compensation amount for compensating an engine rotational speed and a load.

6. The engine air-fuel ratio control system as recited in claim 5, wherein the target air-fuel ratio revision section is further configured to set the unburned fuel quantity compensating value based on an amount obtained by removing the engine rotational speed/load compensation amount from the stabilization fuel quantity increasing factor.

7. The engine air-fuel ratio control system as recited in claim 5, wherein the target air-fuel ratio revision section is further configured to set the unburned fuel quantity compensating value by establishing an initial value obtained by removing the engine rotational speed/load compensation amount from the stabilization fuel quantity increasing factor and then applying a compensation operation to the initial value such that the unburned fuel quantity compensating value decreases as the coolant temperature increases.

8. The engine air-fuel ratio control system as recited in claim 6, wherein the target air-fuel ratio revision section is further configured to calculate the stabilization fuel quantity increasing factor by multiplying a reduction coefficient by a calculated value that includes the engine rotational speed/load compensation amount, with the reduction coefficient being set to 1 before the air-fuel ratio sensor is determined to be active and being decreased at a constant rate from 1 to 0 after the air-fuel ratio sensor is determined to be active.

9. The engine air-fuel ratio control system as recited in claim 6, wherein the air-fuel ratio sensor detection section is further configured to determine the air-fuel ratio sensor to be active based on an output of the air-fuel ratio sensor and an amount of time elapsed since the engine was started.

10. The engine air-fuel ratio control system as recited in claim 6, wherein the air-fuel ratio feedback control section is further configured to start the air-fuel ratio feedback control after a prescribed amount of time has elapsed since the air-fuel ratio sensor was determined to be active, regardless of the air-fuel ratio.

11. The engine air-fuel ratio control system as recited in claim 5, wherein the target air-fuel ratio revision section is further configured to calculate the stabilization fuel quantity increasing factor by using a reduction coefficient whose value decreases over time upon determining the air-fuel ratio sensor to be active such that the stabilization fuel quantity increasing factor decreases at the higher rate than the decreasing rate used before the air-fuel ratio sensor was determined to be active.

12. The engine air-fuel ratio control system as recited in claim 11, wherein the target air-fuel ratio revision section is further configured to calculate the stabilization fuel quantity increasing factor by multiplying a reduction coefficient by a calculated value that includes the engine rotational speedlload compensation amount, with the reduction coefficient being set to 1 before the air-fuel ratio sensor is determined to be active and being decreased at a constant rate from 1 to 0 after the air-fuel ratio sensor is determined to be active.

13. The engine air-fuel ratio control system as recited in claim 11, wherein the target air-fuel ratio revision section is further configured to set the unburned fuel quantity compensating value by removing the engine rotational speed/load compensation amount from the stabilization fuel quantity increasing factor.

14. The engine air-fuel ratio control system as recited in claim 13, wherein the target air-fuel ratio revision section is further configured to set the unburned fuel quantity compensating value by establishing an initial value obtained by removing the engine rotational speed/load compensation amount from the stabilization fuel quantity increasing factor and then applying a compensation operation to the initial value such that the unburned fuel quantity compensating value decreases as the coolant temperature increases.

15. The engine air-fuel ratio control system as recited in claim 11, wherein the air-fuel ratio sensor detection section is further configured to determine the air-fuel ratio sensor to be active based on an output of the air-fuel ratio sensor and an amount of time elapsed since the engine was started.

16. The engine air-fuel ratio control system as recited in claim 11, wherein the air-fuel ratio feedback control section is further configured to start the air-fuel ratio feedback control after a prescribed amount of time has elapsed since the air-fuel ratio sensor was determined to be active, regardless of the air-fuel ratio.

17. An engine air-fuel ratio control system comprising:

means for setting an air-fuel ratio for an engine based on at least one engine operating condition;

air-fuel ratio sensor detection means for determining a status of an air-fuel ratio sensor;

target air-fuel ratio revision means for setting a target air-fuel ratio revising coefficient based on at least a stabilization fuel quantity increasing factor that is set to richen the air-fuel ratio immediately after the engine is started and afterwards to gradually decrease the air-fuel ratio over time to gradually converge towards a stoichiometric value, with the stabilization fuel quantity increasing factor decreasing at a higher rate upon determining the air-fuel ratio sensor to be active than a prior decreasing rate before determining the air-fuel ratio sensor to be active; and air-fuel ratio feedback control means for setting an air-fuel ratio feedback revising coefficient that converges the air-fuel ratio towards the stoichiometric value based on a signal from the air-fuel ratio sensor when an air-fuel ratio feedback control condition is satisfied, and to start an air-fuel ratio feedback control upon the air-fuel ratio approximately reaching the stoichiometric value, the target air-fuel ratio revision means further revising the target air-fuel ratio revising coefficient when the air-fuel ratio feedback control is started by adding an unburned fuel quantity compensating value that is set based on the stabilization fuel quantity increasing factor in effect at that point in time to the target air-fuel ratio revising coefficient while, simultaneously, setting the stabilization fuel quantity increasing factor to zero.

18. A method of controlling an engine air-fuel ratio comprising:

setting the air-fuel ratio for an engine based on at least one engine operating condition;

determining a status of an air-fuel ratio sensor;

setting a target air-fuel ratio revising coefficient based on at least a stabilization fuel quantity increasing factor that is set to richen the air-fuel ratio immediately after the engine is started and afterwards to gradually decrease the air-fuel ratio over time to gradually converge towards a stoichiometric value, with the stabilization fuel quantity increasing factor decreasing at a higher rate upon determining the air-fuel ratio sensor to be active than a prior decreasing rate before determining the air-fuel ratio sensor to be active;

setting an air-fuel ratio feedback revising coefficient that converges the air-fuel ratio towards the stoichiometric value based on a signal from the air-fuel ratio sensor when an air-fuel ratio feedback control condition is satisfied, and to start an air-fuel ratio feedback control upon the air-fuel ratio approximately reaching the stoichiometric value; and revising the target air-fuel ratio revising coefficient when the air-fuel ratio feedback control is started by adding an unburned fuel quantity compensating value that is set based on the stabilization fuel quantity increasing factor in effect at that point in time to the target air-fuel ratio revising coefficient while, simultaneously, setting the stabilization fuel quantity increasing factor to zero.

* * * * *